March 28, 1939.  G. LAVENBURG  2,151,705
ELECTRIC TOASTER
Filed Aug. 19, 1936   2 Sheets-Sheet 1
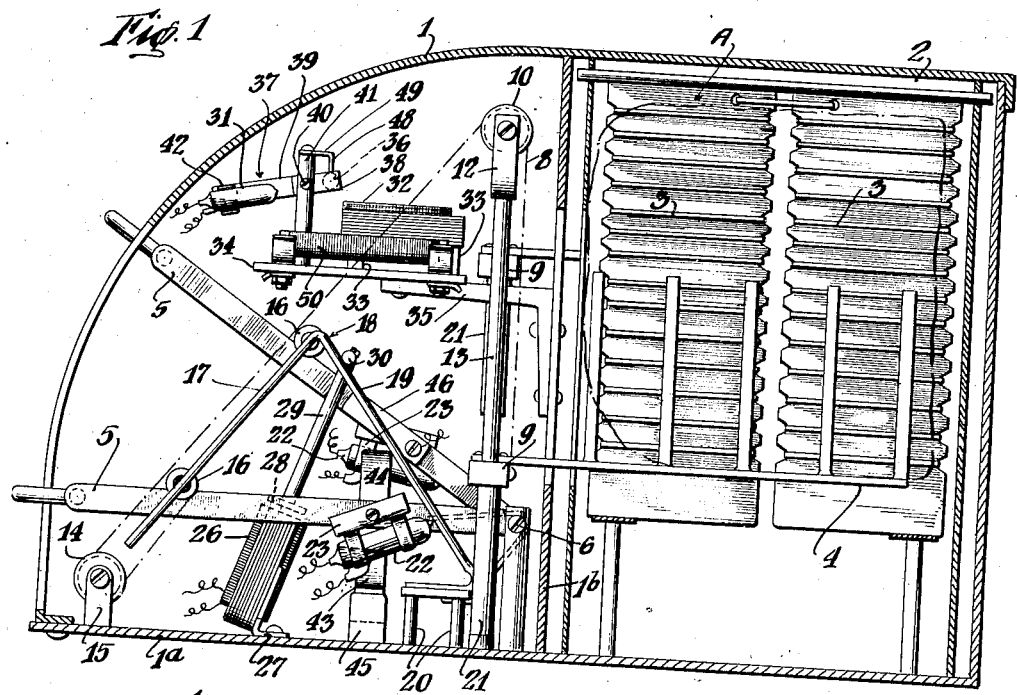
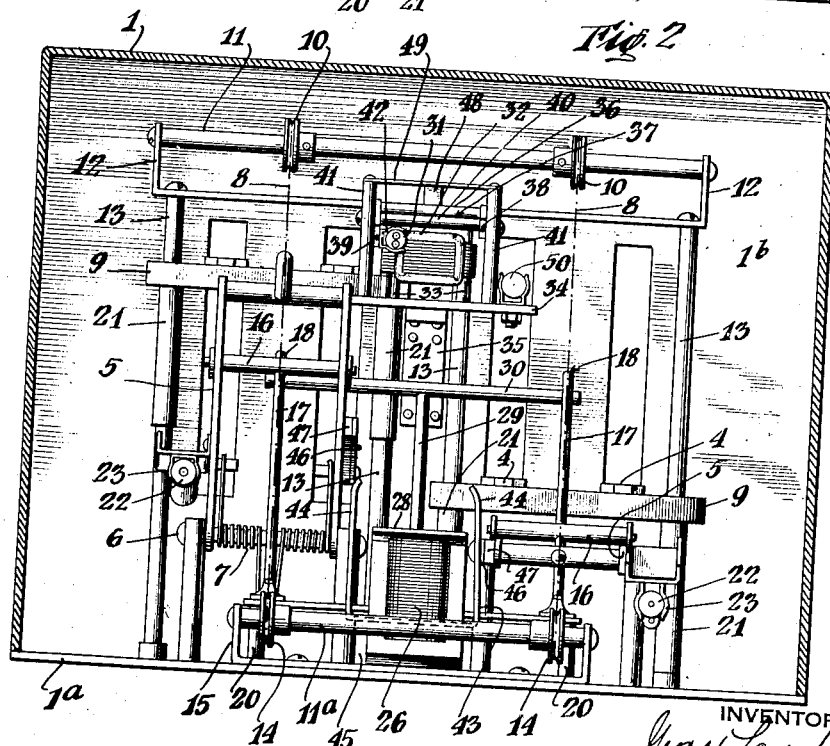
INVENTOR
George Lavenburg March 28, 1939.　　　G. LAVENBURG　　　2,151,705
ELECTRIC TOASTER
Filed Aug. 19, 1936　　　2 Sheets-Sheet 2
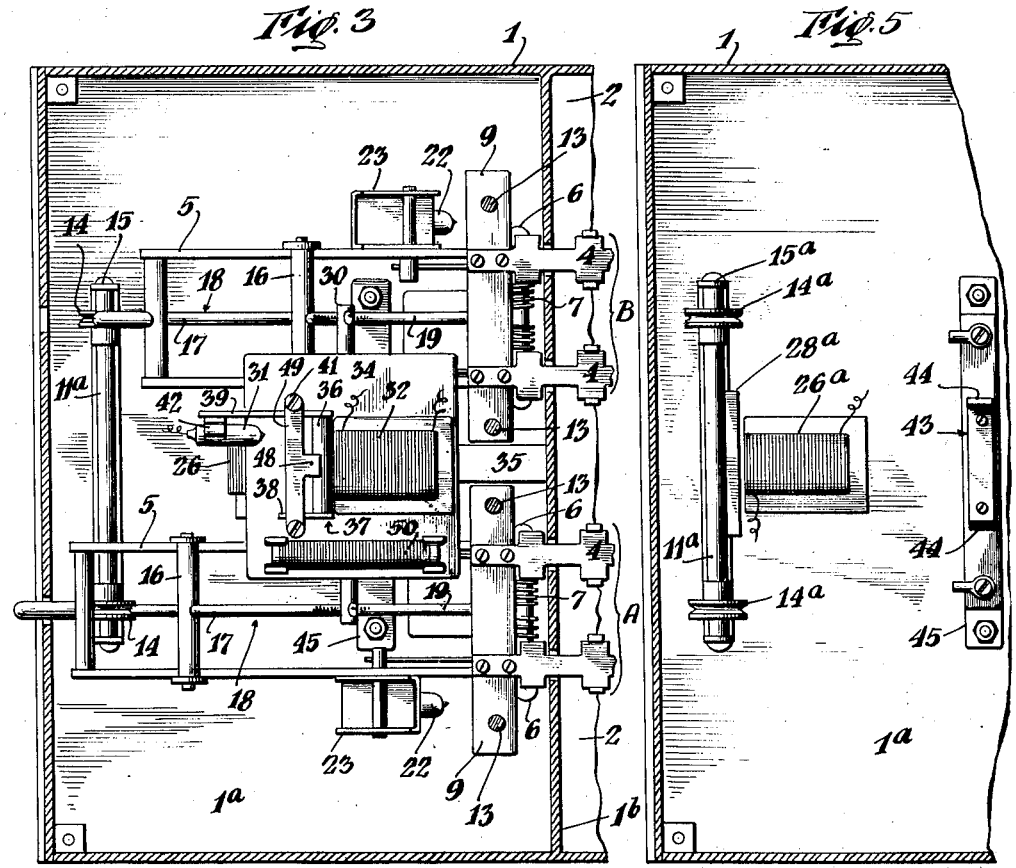
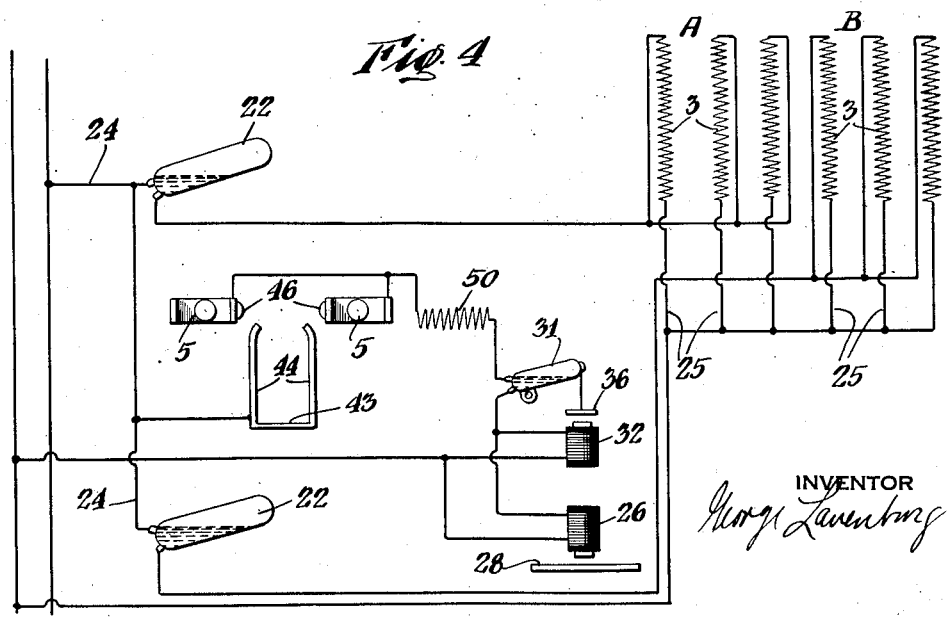

Patented Mar. 28, 1939

2,151,705

UNITED STATES PATENT OFFICE 2,151,705

ELECTRIC TOASTER

George Lavenburg, New York, N. Y.

Application August 19, 1936, Serial No. 96,793

10 Claims. (Cl. 161—16)

This invention relates to new and useful improvements in electric toasters, and particularly to a novel single timing means for operating a plurality of toasting units in one casing.

In my prior Patent No. 2,046,471, issued July 7, 1936, I describe an electric bread toaster, in which the timing of the toasting operation of one toasting unit is controlled by an electric motor delivering, through the agency of an impeller and a steel ball, impacts to the operating mechanism of the toasting platform, and in response to said impacts the toasting platform is moved from any advanced operating position to its normal position.

In my prior Patent No. 2,046,472, issued July 7, 1936, I describe an electric bread toaster, in which the timing of the toasting platform in one toasting unit in a casing is controlled by an electromagnet having an armature comprising a resilient bar; a frictional coupling is connected to said platform, and is associated with said bar and a spring-pressed lever; a circuit interrupter opens and closes the circuit of the electromagnet whereby said magnet will flex said bar and permit said lever, frictional coupling and platform to advance gradually.

In accordance with the present invention, the timing and movement from any advanced position to normal position of a plurality of platforms of a plurality of toasting units in one casing is controlled by one electromagnet.

One embodiment of the present invention is an electromagnet having an armature comprising a resilient bar having a plurality of resilient legs, each leg associated with a toasting unit, all the legs being joined and in operative relationship to said magnet; and a single circuit interrupter opens and closes the circuit of the magnet whereby said magnet will flex both legs and permit the lever, frictional coupling and platform of any one or all units in operation to gradually advance automatically.

Another embodiment of the present invention is an electromagnet having an armature comprising a fixed pulsating armature bar associated with said platforms in operative relationship to said magnet so that when an alternating current is passed through said magnet said bar is pulsating and said lever, frictional coupling and platform of any one or all units in operation will be continuously and automatically advanced as said pulsations continue, a single circuit interrupter opening and closing the circuit of the magnet being employed to control or regulate, delay and slow up the magnetic pulsations or fluxes set up in said bar from said magnet and to time the gradual advance of each or all of said platforms.

Further objects of my present invention are to provide a single automatic means for controlling the timing and movement of a plurality of toasting platforms of a plurality of toasting units from a plurality of advanced positions back to normal or idle positions; to enable the toasting units to be placed in action in any sequence and without regard to any time relationship; to maintain the automatic means in operation until the completion of the toasting operation of the unit last put into operation; to enable the unit in which the toasting operation is instigated to complete its performance without regard to the instigation or completion of performance of another unit, whether commenced before, at the same time or after each other; to automatically turn on or shut off the heat or current for each unit at the beginning and completion respectively of the cycle of operation of that unit without affecting or being affected by the stage of operation of the other unit; to provide circuits, systems or methods therefor; to provide an improved circuit interrupter; to secure simplicity of construction and operation; and to obtain other advantages and results as may be brought out in the following description.

Referring to the accompanying drawings in which like numerals of reference indicate similar parts throughout the several views:

Figure 1 is a view partially in side elevation and partially in section showing the operating mechanism, and ovens and toasting platforms without a casing embodying my invention, with the casing in section;

Figure 2 is a front view of the operating mechanism with the casing in section so as to disclose said mechanism;

Figure 3 is a plan of the operating mechanism, showing the casing in section and the platforms and oven broken away;

Figure 4 is a diagrammatic view of the electric circuits involved; and

Figure 5 is a plan view of a modified pulsation device, system or method.

In the specific embodiment of the invention, illustrated in said drawings, it will be noted, particularly as the description progresses, that I employ a plurality of toasting units, having illustrated two such units in one casing by way of exemplification of the plurality. Each unit provides an oven with openings for the plurality of slices of bread, and again two such oven openings are shown for each unit as exemplification of the plurality. It is to be understood, however, that neither the showing in the drawings nor the description thereof, wherein I refer more particularly to the pairs of units and pairs of ovens is there any purport to utilize the word by way of limitation, but only a specific example of the broader concept of the utilization of a plurality.

Much of the basic mechanism disclosed in the present application is the same as or similar to that which is shown and described in my said prior Patent No. 2,046,472. The structure accordingly includes casing 1, having a base 1a, and toasting compartment or oven 2 enclosing resistance elements 3 and bread platform 4, by means of which slices of bread may be moved vertically with respect to the compartment. When it is desired to make toast, slices of bread are inserted in the oven through slots provided in the top thereof, and rest on the platform 4 between adjacent resistance elements 3.

Toasting units, A and B, are alike, adjoining each other in one casing, and may be operated independently or together, manually or automatically. A description of unit A is given which will also describe unit B. Each unit provides a platform 4 distinct, separate and spaced apart from the platform of the other unit, so that they may be independently raised and lowered, and the resistance elements 3 of each unit are so arranged, as will be hereinafter more particularly described, to be turned on or shut off independently regardless of whether or not the heating element of the other units are on or off.

A bifurcated lever 5, forming the operating handle of each unit, is then rotated downward around its pivot shaft 6 and against the tension of spring 7. If both levers of both units are rotated downward, units A and B are both being operated; if but one lever is rotated downward, only one of the units is being operated. As lever 5 is moved downward, platform 4 drops by gravity, drawing with it a cable 8, one end of which is attached to a plate 9 connected to the projecting end of the platform 4 projecting through the oven wall. The same structure is duplicated for the adjacent unit. The cable 8 passes over a roller 10 mounted on a transverse shaft 11 common to both units and carried in a bracket 12 situated on posts 13 in front of the oven wall and a roller 14 mounted on a shaft 11a carried in a lower transverse bracket 15 on the base 1a. The other end of each cable 8 is attached at the middle of a slider 16, one for each unit, which extends crosswise of, and slides next to its ends upon, the bifurcations of said lever 5. Said slider is shown as having a diametric slit midway of its length through which passes one diagonally-disposed leg 17 of a resilient bar 18, the other leg 19 of which bends substantially at right angles with respect thereto and is secured to the base 1a as by studs 20. The frictional engagement between the slider 16 and the edges of the bifurcations of lever 5 and the frictional engagement of the slider with the surface of leg 17, is such that considerable resistance is offered to displacement of the slider and its attached cable 8. This resistance is overcome by the manual depression of the lever 5, leaving the slider 16 free to travel downward, as by gravity. Once slider 16 is moved into its lowermost position, the tension of spring 7 exerted on bar 18 through lever 5 is insufficient to move slider 16 into the opposite direction and thus lift the platform 4 unless the operator grasps the handle 5 and pushes it upward. In this manner each platform of each unit can be manually moved from a toasting to its idle position.

The horizontal positioning of plate 9 and platform 4 is insured by sleeves 21 fastened to each end of plate 9. Posts 13 fastened to base 1a project within the sleeves 21, and through plate 9, the plate and its sleeves thus being free to slide up and down on these posts. Shortly after lever 5 leaves its idle position, a mercury switch 22 will be tipped from the position shown in dotted lines in Fig. 1 into the position shown in full lines. The mercury switch 22 is clamped in a bracket 23 fastened to one of the bifurcations of lever 5, preferably on the left side near the center, and so positioned that the mercury therein will run from one end to the other end of the switch.

When mercury switch 22 is thus tipped it closes a circuit from power line legs 24 through the resistances 3 in parallel of, say, unit A, through conductors 25 back to the other side of the line. When mercury switch 22 of unit B is thus tipped, it closes a similar circuit through conductors 25 back to the other side of the line. When both mercury switches 22 are thus tipped they close a circuit from said power line through resistances 3 and 3 in parallel of both units, through conductors 25 back to the other side of the line, and all the resistances of both units will, thus be transversed by current.

An automatic means in the form of electromagnetic mechanism is also provided for moving platform 4 from its toasting to its idle position, for any one or both units, independently or together. This automatic means consists of an electromagnet 26 mounted on base 1a by means of a bracket 27 and cooperating with an armature 28, preferably formed with a T-leg 29 depending from the middle of a cross bar 30 attached at its ends by welding or otherwise to the plurality of resilient bars 18, preferably close to the apexes between legs 17 and 19 thereof. When the magnet 26 is energized, it will attract its armature 18, and thus flex both the resilient bars 18 downward, and when deenergized, said magnet will then permit said cross bar 30 and said resilient bars 18, due to their resiliency, to return to original positions. The back-and-forth movement imparted to leg 17 with respect to its slider 16, which has been moved to any position below its uppermost or normal position, will impart a momentary release of the frictional engagement and permit a slight sliding of the slider 16 toward its normal position with each such release.

The effect secured is a step-by-step movement of slider and platform under the joint action of the motion of leg 17, and the motion of lever 5 caused by spring 7, and thus a gradual lifting of the platform into its top or normal position. This action is effective from the one magnet upon either or both of the sliders so that only one magnet is used to operate the plurality of units. If one unit, for instance, unit A, is being operated only, the same action takes place, both bars 18 flexing, the idle unit B in no way affecting the operated unit. Either unit may be started, held, delayed or advanced independently or together. Since both bars 18 are flexing at all times, the timing of the movement of platform 4 from toasting to idle position in operated unit A is not affected by the idle unit B. The heavier the weight of bread on the platform, the slower will be the step-by-step movement, and the lighter the weight of bread the faster the movement, due to the slight change in frictional resistance on each slider in operation. This delay or increase in the timing, due to the different weights of bread is highly desirable, and is not affected by the aforesaid automatic means, nor is the automatic means affected thereby.

The circuit of magnet 26 extends from one leg of power lines 24 through another mercury switch 31 and the winding of magnet 26 back to the line, energizing magnet 26. The opening and closing of mercury switch 31 which controls magnet 26 is controlled by an electromagnet 32 mounted by means of studs 33 on a panel 34 of insulating material such as Bakelite, hard rubber, or the like, which panel is mounted by appropriate means such as bracket 35 on a transverse inner wall or partition 1b of the casing. Magnet 32 is provided with an armature 36, included as part of an element 37 having two legs 38 and 39 fastened to armature 36; said legs 38 and 39 having apertures through which a shaft 40 extends, the shaft 40 being fastened by studs 41 mounted on panel 34. Mercury switch 31 is mounted by means of a bracket 42 on leg 39. The armature is thus free and adapted to oscillate on said shaft 40, and thus, with the weight of leg 39 and switch 31 to fall by gravity. There is no physical connection between magnet 32 and its armature 36, the armature 36 being caused to tilt down and switch 31 to open under the influence of the winding of magnet 32 operatively positioned with respect to said armature 36. In the deenergized position of magnet 32, the mercury switch 31 is closed, and in its energized position it is open, the tilting armature 36 having tilted by gravity in a counterclockwise direction so as to close said switch. Magnet 32 is connected in parallel with magnet 26. Therefore, through the agency of mercury switch 31, it will operate as a buzzer alternately to close and open its own energizing circuit and that of magnet 26, so long as contact switches 43, hereinafter described, maintain its circuit closed.

To maintain the operation of the automatic means after the heating circuit of any one or all the units in operation has been shut off, I provide for each unit a contact switch 43, which becomes engaged by the bifurcations of lever 5 almost immediately upon rotating the lever downward. This engagement is made immediately before the mercury switch 23 on lever 5 is fully tilted to close the heating circuit. Switch 43 has a spring contact 44 connected to insulative terminal block 45 mounted on base 1a. Contact 44 is of spring-like material upwardly directed, and so positioned and of a suitable length as to rub against or frictionally engage the other contact 46 of switch 43, which is mounted on an insulating block 47 mounted on one of the bifurcations of lever 5. In the uppermost position of lever 5, contact 44 is slightly bent away from said lever, at which bent away point the contacts 44 and 46 are separated. As lever 5 is pulled downward contacts 44 and 46 meet, closing said switch 43 and closing the electromagnetic circuit and its control circuit, and as the lever is pulled down slightly further it then closes mercury switch 23 closing the heating circuit. On the upward movement of lever 5, mercury switch 22 is first fully tilted to open, thus opening the heating circuit, before lever 5 has reached the said bent away portion of contact 44, which when so reached opens said switch 43 and also opens said electromagnetic circuit and its control circuit. Contact 44 is connected to one side of line 24, and contact 46 is connected to the other side of line 24, magnets 32 and 26 being in series with one of these connections. Thus, so long as the lever is in depressed position magnet 32 will act upon its armature 36 and effect the step-by-step advance of the slider and gradual return of the lever and platform, under the action of the pull magnet 26 upon armature bar 18, to normal position. The circuit and structure employed provide switches 43 for each lever, and by placing these switches 43 in parallel, and preferably their spring contacts 44 or common to each other, and in series with mercury switch 31, it will be observed that the electromagnetic circuit and its control circuit are kept operating so long as either lever is depressed. Consequently, bread may be introduced for toasting in one unit and that unit set in operation. Before the bread of that unit is toasted and while the unit is still functioning bread may be placed in the other unit and its lever depressed whereupon both units will be functioning, the first one only for the remaining time of its toasting period, and the second one for its own full period.

As another embodiment for operating one or a plurality of toasting units with one timing means, I employ a device for creating pulsations, and means for utilizing said pulsations for movement and timing. An automatic means or device for obtaining such pulsations is as illustrated in Fig. 5 an electromagnet 26a mounted on base 1a, and cooperating with an armature 28a, comprising a metallic bar secured to transverse shaft 11a common to both units carried in a support or bracket 15a mounted on base 1a. Bracket or support 15a is fixed and substantially non-yielding, and armature 28a and shaft 11a are therefore rigidly supported and substantially fixed and stationary and incapable of free vibration. Armature 28a and shaft 11a may be of one integral piece. Roller 14a of each unit is mounted on shaft 11a. Armature 28a and shaft 11a are preferably physically separated from magnet 26a, and, except for the magnetic fluxes or pulsations in the space between them and imparted through said armature 28a and shaft 11a, when magnet 26a is energized by an alternating current, they are stationary and fixed and have no visible movement. The same structure, frictional resistance and circuits as employed in the first embodiment for gradual advance of the support or supports are except the pulsation aforesaid used for this second embodiment, except that in this second embodiment bar 18 is not an armature or part thereof, as in the first embodiment, does not flex, move or vibrate, and, therefore, is not necessarily resilient, and its leg 17 merely acts as a slider for slider 16, and except, also, that cross bar 30 and T-leg 29 are omitted. For continuous instead of gradual advance, the circuit interrupter 31, 36 and 32 may be omitted entirely. In this second embodiment, energization of magnet 26a alone is required both for continuous or gradual advance whereas in the first embodiment the said circuit interrupter had to be employed, only gradual advance was obtainable and energization and deenergization was essential.

In order to utilize said pulsations for movement, when magnet 26a is energized, the flux therefrom will pass through said substantially stationary armature 28a and shaft 11a and thereby produce or create pulsations therein, and movement under the influence of said pulsations will be transmitted to rollers 14a, and the respective cable 8, slider 16 on slide 18, through lever 5, and spring 7, of each unit which will impart a momentary release of the frictional engagement and permit a slight sliding of the slide on its slider toward its normal position with each such release. The effect secured is a continuous movement of slider and its platform into its top position. The pulsations in armature 28a set up corresponding pulsations in shaft 11a because of the physical connection therebetween. Inasmuch as rollers 14a for both units are upon shaft 11a, they in turn will be excited and aided by the release of said frictional resistance caused to rotate in one direction and will impart movement to the cables 8 extending therearound. I utilize alternating current to energize the magnet 26a, and by virtue of the frequency of the current variations in the magnetic pulsations or fluxes are set up and a pulsating energy is introduced in said armature 28a and shaft 11a which sets up a corresponding movement of the associated rollers, and their respective cables, sliders, spring-pressed levers and platforms. The control circuit and the circuit interrupter of the previous embodiment is utilized to control and regulate the pulsations, and as a result the pulsations are delayed and periodically interrupted, causing a gradual lifting of the platform or platforms into their respective normal positions.

Thus, in both embodiments, when the heating circuit of one or both units is or are being traversed by current as aforesaid, magnet 26 and its armature 28, will flex bars 18, or magnet 26a and its armature 28a will pulsate and impart movement to the associated parts, and mercury switch 31 will tilt at a certain speed. The extent to which armature 36 is permitted to oscillate is controlled by means of a finger 48 and cross piece 49 mounted on studs 41. Preferably magnets 26, 26a and 32 have laminated cores. By means of the electrical and mechanical characteristics of magnet 32, and the shape and length of mercury switch 31, the timing of successive operations of magnet 32 may be fixed at will. The current to magnet 32 may be lowered by including a suitable resistance 50 in series therewith.

In Figure 4, I have shown a circuit diagram embodying the features and structures above explained. While the diagram illustrates the circuit interrupter with its switch 31 and magnet 32, in series between magnet 26 and the bifurcations of lever 5, it will be understood that for use with alternating current in the second embodiment employing the pulsation principle, the connection from lever 5 to magnet 26 may be made directly without the said intervening circuit interrupter, if preferred.

I claim:

1. In an electric toaster, an oven, electric heating means associated with said oven, a circuit for said heating means, a first switch controlling said circuit, a food support, means for moving said support in two opposed directions with respect to said oven, electromagnetic means including a mercury switch for automatically operating said means for moving said support in one direction, a third switch in series with said mercury switch controlling said electromagnetic means, said means for moving said support controlling said first and third switches, and separate means for automatically and independently opening said first and third switches at substantially the same time.

2. In an electric toaster, a pair of electric heating means, first and second circuits one for each said heating means, first and second switches one for each said circuit, a pair of spaced and separate food supports one for each heating means and each adapted to move independently in two opposed directions adjacent its said respective heating means, a single automatic means having a third circuit for simultaneously moving said supports in one direction, and third and fourth switches individually controlling said third circuit, the first and third switches being independently controlled by one support and the second and fourth switches being independently controlled by the other support.

3. In an electric toaster, a pair of electric heating means, first and second circuits one for each heating means, first and second switches one for each circuit, a pair of spaced and separate food supports one for each heating means and adapted to move independently from a normal to a plurality of advanced positions adjacent its said respective heating means, electromagnetic means including a third circuit for simultaneously moving both said supports to their respective normal positions, and third and fourth switches connected in parallel and each connected in series with said third circuit for individually controlling said electromagnetic means, said first and third switches being independently controlled by one support and the second and fourth switches being independently controlled by the other support.

4. In an electric toaster, a pair of electric heating means, first and second circuits one for each heating means, first and second switches one for each said circuit, a pair of spaced and separate food supports one for each heating means and adapted to move independently in two opposed directions adjacent its said respective heating means, electromagnetic means including a third circuit and a third switch for simultaneously moving both said supports in one direction, and fourth and fifth switches each connected in series with said third circuit for individually controlling said electromagnetic means, said first and fourth switches being independently controlled by one support and the second and fifth switches being independently controlled by the other support.

5. An electric toaster comprising a casing having a plurality of separate toasting units, a plurality of electric heating means one for each unit, a plurality of switches one for each heating means, a plurality of spaced and separate food supports one for each unit and each adapted to move independently from a normal to a plurality of advanced positions adjacent its respective heating means, a single automatic means for simultaneously moving all said supports to their respective normal positions, and means for maintaining the operation of said automatic means after the supply of heat of one of said units has been cut off.

6. An electric toaster comprising a casing having a plurality of separate toasting units, a plurality of electric heating means one for each unit, a plurality of spaced and separate food supports one for each unit and each adapted to move independently from a normal to an operable position with respect to its respective heating means, a single automatic means for simultaneously moving said supports to said normal positions, separate means for automatically cutting off the supply of heat in each unit when the support in each unit has returned back to its respective normal position, and means for automatically stopping the operation of the automatic means substantially when the heat supply has been shut off in all said units.

7. In an electric toaster for alternating current, a pair of separate toasting units, a pair of electric heating means one for each unit, a pair of spaced and separate food supports one for each unit and each adapted to move independently in two opposed directions adjacent its said respective heating means, a pair of handles one for each support, an electromagnet having an armature comprising a substantially fixed and stationary bar, means for passing the flux resultant from the alternating current from said magnet into said armature and thereby produce pulsations therein, and means responsive to said pulsations for simultaneously moving said supports in one direction on the energization of said magnet.

8. In an electric toaster for alternating current, a pair of separate toasting units, a pair of electric heating means one for each unit, a pair of spaced and separate food supports one for each unit and each adapted to move independently in two opposed directions adjacent its said respective heating means, a pair of handles one for each support, an electromagnet having a circuit and an armature comprising a substantially fixed and stationary bar, means for passing the flux resultant from the alternating current from said magnet into said armature and thereby produce pulsations therein, means for opening and closing said circuit, and means responsive to said pulsations for simultaneously and gradually moving said supports in one direction on the repeated opening and closing of said circuit.

9. A device for producing movement of a movable element in one direction by use of alternating current comprising an electromagnet, a substantially fixed and stationary armature associated with said element, means whereby the flux resultant from the alternating current from said magnet will produce pulsations in said armature, and means responsive to said pulsations for producing movement of said element.

10. In a toaster, an oven, heating means associated with said oven, a food platform, means for lowering said platform into said oven, a cable for raising said platform within said oven, a slide, a spring pressed pivoted lever, a slider attached to one end of said cable and forced by said lever into frictional engagement with said slide, an electromagnet, an armature bar therefor, a roller rotatably mounted on said bar and carrying said cable, whereby upon the energization of said magnet the flux therefrom will produce pulsations in said bar and permit said slider to move with respect to said slide.

GEORGE LAVENBURG.